United States Patent [19]

Goldman et al.

[11] Patent Number: 5,590,229
[45] Date of Patent: Dec. 31, 1996

[54] MULTICHANNEL FIBER OPTIC CONNECTOR

[75] Inventors: Robert P. Goldman, Woodland Hills; Akbar Arab-Sadeghabadi, Simi Valley; Anselm F. Varni, Woodland Hills, all of Calif.

[73] Assignee: Litton Systems, Inc., Woodland Hills, Calif.

[21] Appl. No.: 231,385

[22] Filed: Apr. 22, 1994

[51] Int. Cl.[6] .................................................. G02B 6/38
[52] U.S. Cl. ................................................. 385/59; 385/71
[58] Field of Search ............................... 385/59, 71, 89, 385/60, 55, 77, 53

[56] References Cited

U.S. PATENT DOCUMENTS

| | | | |
|---|---|---|---|
| 4,174,882 | 11/1979 | McCartney | 385/71 |
| 4,361,380 | 11/1982 | Marazzi | 350/96.21 |
| 4,390,237 | 7/1983 | Marazzi | 350/96.2 |
| 4,763,980 | 8/1988 | Gerber et al. | 350/96.2 |
| 4,820,185 | 4/1989 | Moulin | 385/59 X |
| 5,062,682 | 11/1991 | Marazzi | 385/85 |
| 5,265,182 | 11/1993 | Hartley | 385/59 X |
| 5,283,848 | 2/1994 | Abendschein et al. | 385/71 |

FOREIGN PATENT DOCUMENTS

| | | |
|---|---|---|
| 1262210 | 10/1989 | Canada . |
| 0194325 | 9/1986 | European Pat. Off. . |
| 0354173 | 2/1990 | European Pat. Off. . |
| 0362128 | 4/1990 | European Pat. Off. . |
| 0429398 | 5/1991 | European Pat. Off. . |
| 4203966 | 8/1992 | Germany . |

OTHER PUBLICATIONS

Publications: Rifocs Corporation, "Ultra High Return Loss Connectors" (Dec. 1992).
Rifocs Corporation, "Technical Description of Diamond S.A. Active Core Alignment Process" (Jun. 1, 1990).
ITT Cannon, "Make Contact With ITT Cannon Fiber Optics"(1988) no month.

Primary Examiner—John D. Lee
Assistant Examiner—Phan T. H. Palmer
Attorney, Agent, or Firm—Elliott N. Kramsky

[57] ABSTRACT

A connector for making and securing low loss optical contact between a first plurality of optical fibers, each including a ferrule-encapsulated terminal end, and a second plurality of optical fibers, each also including a ferrule-encapsulated terminal end. Each of the ferrules is individually fixed to a cap that includes an asymmetrical keying member. Male and female connector members include internal channels for accepting ferrule-fixed cups with predetermined angular orientations. Springs are axially aligned within the channels for independently urging each cup-fixed ferrule into optical contact with a mating ferrule. In this way, multiple rotational and axial alignments are simultaneously and independently achieved and maintained between mated pairs of optical fibers.

21 Claims, 5 Drawing Sheets

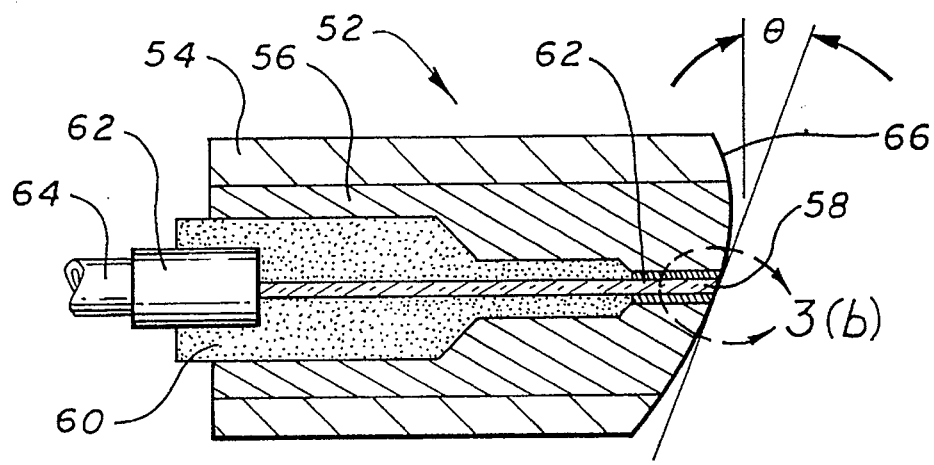
FIG. 3(a)
FIG. 3(b)
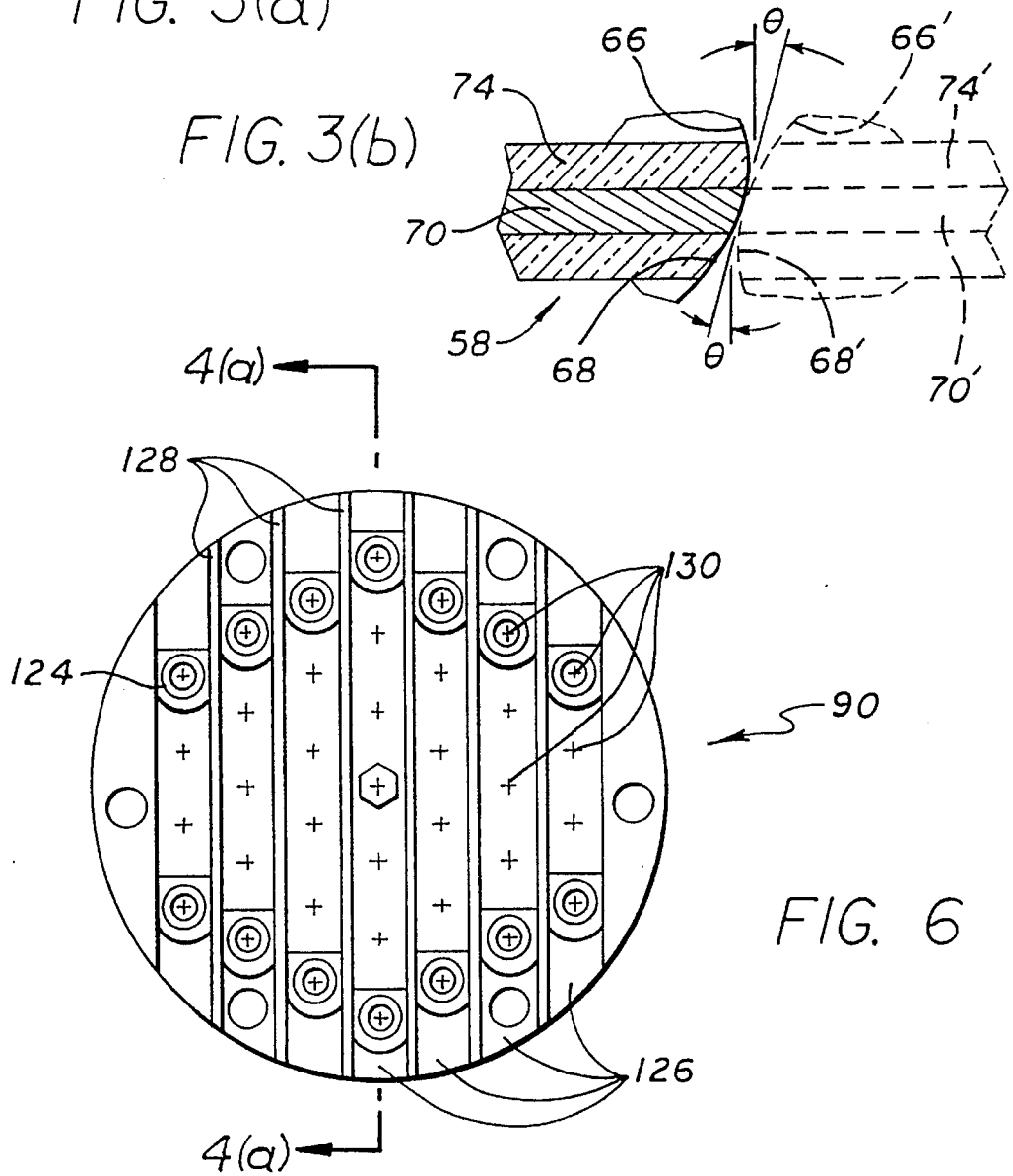
FIG. 6

MULTICHANNEL FIBER OPTIC CONNECTOR

BACKGROUND

1. Field of the Invention

The present invention relates to apparatus for facilitating the use of a fiber optic sensor array. More particularly, this invention pertains to a connector for simultaneously completing a plurality of reliable low-loss optical interconnections.

2. Description of the Prior Art

SONAR-based systems for detecting underwater hazards employ pressure transducers of the hydrophone type for generating signals indicative of the presence and locations of underwater objects. In an active system, such objects are sensed by means of acoustic signals that are generated and transmitted from a mother ship. The reflected acoustic signals, when processed, enable one to detect and ascertain the signature, position, velocity and other features of underwater objects such as submarines. In passive systems, acoustic signals are generated by and radiated from the submerged object.

Fiber optic (visa vis electrical) technology offers a number of advantages in hydrophone design. Since fiber optic systems are electrically passive, the risks associated with exposure of electrical elements to water are avoided. The use of all-optical telemetry data systems is facilitated as the sensor is itself an optical device. In a completely optical detection and telemetry system, extraneous electromagnetic noise is eliminated. Other advantages include an increase in system bandwidth and considerable weight reduction.

The optical signals generated by the fiber optic hydrophone are transmitted along optical fibers. The thread-like optical fiber presents a relatively flimsy element requiring mating with a mechanical termination element to permit accurate positioning of the fiber end for optically coupling the signal therein to another fiber when required. A useful optical fiber termination is the well-known optical ferrule. One type, the ceramic ferrule, comprises a shell (e.g. zirconia) with an adhesive interior for holding the fiber. Unfortunately, differences in the coefficients of thermal expansion of the zirconia and the adhesive can result in adhesive creep in which the adhesive flows, degrading performance. An improvement in this regard is the tungsten carbide ferrule comprising a shell of tungsten carbide and an Ni/Ag filler material that surrounds the terminal end of the fiber. The coefficient of thermal expansion of the shell and the filler material do not differ significantly from one another, eliminating the problems associated with significant creep or flow. Examples of commercially available ferrules of the tungsten carbide type are those marketed by Diamond SA of Losone, Switzerland under designations FC-PC, ST-PC and DIN.

In a common application, an optical SONAR system employs a predetermined submergeable array comprising a plurality of acoustic hydrophones to collect a spatial distribution of acoustic information for analysis and signal processing purposes. The fiber optic hydrophone array is usually housed within a hose-like element that is fixed to the end of a towing cable that comprises an arrangement of optical fibers within a protected outer jacket. An example of such a cable is disclosed in U.S. Pat. No. 4,952,012 of Stamnitz entitled "Electro-Opto-Mechanical Cable For Fiber Optic Transmission Systems." The processing of data from an array is well-known and discussed, for example, by A. Dandridge et al. in the article "Multiplexing of Interferometric Sensors Using Phase Carrier Techniques," *Journal of Lightwave Technology*, Vol. LT-5, No. 7 (July 1987) at pages 947–952.

While the fiber optic towed array is a recognized element of an optical SONAR system, its realization in practice is complicated by a number of serious mechanical and optical design considerations. Towed fiber optic hydrophone arrays can include a multiplicity of array modules, each comprising a hose-like covering that encloses a serial hydrophone arrangement. The modules are, in turn, coupled to one another and to a tow cable. Optical connections must be made through the hydrophones and to a mother ship. In the case of an array that includes a large plurality of hydrophones, a correspondingly large number of reliable optical connections must be made and maintained simultaneously to assure successful operation.

The maintenance of multiple reliable optical contacts in the operational environment is complex. Optical fiber connections, unlike electrical, demand precise optical alignment of the members and can be significantly degraded by the presence of environmentally induced forces. The failure to obtain precise alignment of fiber terminations can contribute significantly to optical signal loss. This is in contrast to electrical connections which essentially require only that contact be maintained.

Due to the frequent utilization of acoustic sensing systems for military applications, hydrophone systems must meet stringent military specifications that often exceed those of the commercial world. Such uses impose very low insertion loss requirements (typically less than a few tenths of a decibel) that place even greater emphasis upon the maintenance of precision alignment. In addition to accurate alignment, low loss operation also requires the maintenance of good optical contact between conductors. This is particularly difficult when one deals with the single mode optical fiber that is generally employed in fiber optic sensor arrays. The core diameter of such fiber is typically much smaller than that of "ordinary" multimode fiber. Connections of such fibers are sensitive to not only axial but also to rotational misalignment. Either type of misalignment will introduce noise due to poor coupling, optical interference and/or retroflection.

SUMMARY OF THE INVENTION

The present invention addresses the foregoing and other shortcomings of the prior art by providing, in a first aspect, a connector for simultaneously contacting a first plurality of optical fibers, each of which includes a ferrule-mounted terminal end, with a second plurality of optical fibers, each of which also includes a ferrule-mounted terminal end. The connector of the invention includes a male member for retaining the first plurality of ferrule-mounted terminal ends and a female member for retaining the second plurality of ferrule-mounted terminal ends. The male and female members are arranged so that, when engaged to one another, the terminal ends of corresponding optical fibers are axially aligned. Each of the male and female members includes a spring-loaded assembly for exerting a compressive force between the ends of aligned, ferrule-mounted optical fibers and a fastener for engaging the male and female members to one another.

In a second aspect of the invention there is provided a multichannel fiber optic connector that includes a male member and female member, each of which includes a plurality of substantially-aligned channels therethrough. A spring-loaded assembly is associated with and positioned within each of the channels. A fastener is provided for engaging the members to one another so that corresponding channels of the members are simultaneously aligned.

In a third aspect, a like connector is provided that includes a male member for retaining the first plurality of ferrule-mounted terminal ends and a female member for retaining the second plurality of ferrule-mounted terminal ends. The male and female members are arranged so that, when engaged to one another, the terminal ends of corresponding optical fibers are axially aligned. An asymmetrical keying assembly is associated with each of the fibers for rotationally aligning the terminal ends thereof. A threaded fastener is associated with each of the members for securing optical contact between corresponding optical fibers.

The preceding and other features and advantages of the present invention will become further apparent from the detailed description that follows. Such description is accompanied by a set of drawing figures. Numerals of the drawing figures, corresponding to those of the written description, point to the features of the invention. Like numerals refer to like features throughout both the written description and the drawing figures.

BRIEF DESCRIPTION OF THE DRAWINGS

FIG. 1(a) presents a fiber optic array incorporating multiple optical connectors in accordance with the invention while

FIG. 3(a) is a side sectional view of a ferrule termination of a type suitable for incorporation into a multiple optical connector in accordance with the invention and FIG. 3(b) is a greatly enlarged and detailed view of a portion of the terminal end of the optical fiber within that ferrule and of a mating optical fiber (in shadow outline);

FIG. 6 is a plan view of the rear surface of a body element (male or female member) taken at line 6—6 of FIG. 4(a) and illustrating mechanisms for locking the rotational orientation of a ferrule within an axial alignment channel of a male or female member.

DETAILED DESCRIPTION

Occasional reference will be made in the discussion that follows to primed (and sometimes double-primed) numerals when referring to elements of the invention. Resort is made to such notation only when referring to symmetrically corresponding features. Also, occasional use will be made of a single numeral to identify each of a plurality of identical elements. In either case, such notation has been adopted for purposes of clarity and to facilitate the reader's comprehension of the invention.

Figure 1A:
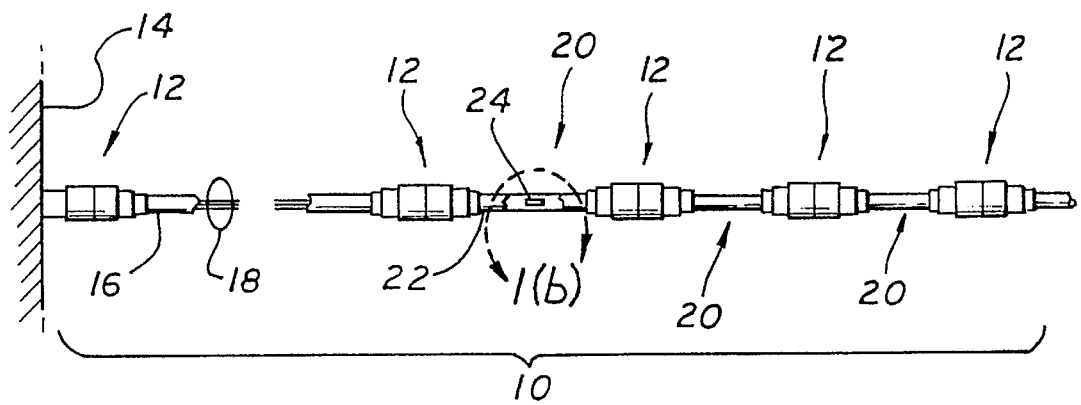

FIG. 1(a) illustrates a fiber optic array 10 that incorporates a plurality of multiple optical connectors (each designated 12) in accordance with the invention. As shown, the plurality of connectors 12 achieves a continuous serial link for transmission of optical signals between a mother ship 14 (having associated optical energy source and electronic processing arrangements), an elongated tow cable 16 (enclosing a plurality of optical fibers 18) and a plurality of underwater array modules, each indicated as 20.

Figure 1B:
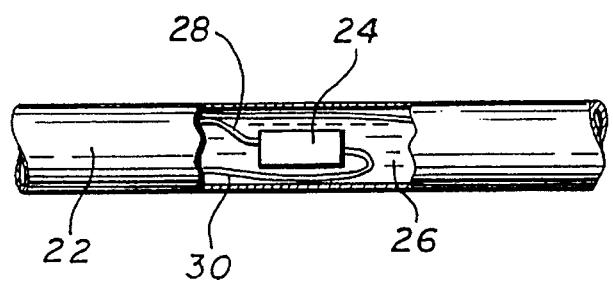
FIG. 1(b) is an enlarged and detailed view of an array module taken at line 1(b) of FIG. 1(a)

Each of the modules 20 includes a hose-like exterior covering 22 within which is located a plurality of acousto-optic hydrophone transducers such as the hydrophone 24 of FIG. 1(b), an enlarged and detailed view, taken at line 1(b) of FIG. 1(a), of a representative array module 20. As mentioned earlier, a hose-like covering 22 is of rubber or appropriate synthetic material such as acrylate. The covering 22 encloses a plurality of appropriately spaced and interconnected interferometric acousto-optical hydrophones, such as the hydrophone 24, each positioned in serially-spaced relationship within the module 20. Typical hydrophone designs feature a winding of optical fiber about a pressure-sensitive mandrel. An appropriate fill fluid 26 floods the array module 20. The fill fluid 26 is provided for transmitting incident acoustic wave pressure from a surrounding body of water to the pressure-sensitive hydrophones of the array module 20. An optical input signal is conducted to the hydrophone 24 through an "input" optical fiber segment 28 while the modulated optical "output" signal from the hydrophone 24 is transmitted through an output fiber segment 30. (Note: The input and output fiber segments 28 and 30 represent different portions of a single continuous optical fiber. An intermediate segment comprises a plurality turns about a pressure-sensitive mandrel, as mentioned above. Likewise, a second fiber for collecting a reference signal may be associated with each hydrophone. Such a fiber might be wrapped about a "dummy" mandrel (i.e. a mandrel whose diameter is not responsive to acoustic pressure inputs) for correcting data to account for the effects of temperature and other bias sources.

The arrangement illustrated in FIG. 1(b) is representative of the plurality of modules 20 that comprise the array 10. Thus two optical fibers requiring two optical connections are associated with each hydrophone 24 of each array module 20. Accordingly, (at least) two fibers with associated ferrules, are required for each hydrophone 24. Further, as one proceeds from the "end" array module 20 to that proximate the tow cable 16, an increasing number of hydrophone output fibers must be interconnected since the outputs of the hydrophones of "trailing" array modules must be transmitted through adjacent "upstream" array modules for eventual transmission to the ship 14.

I. Multiple Optical Connector: Male and Female Members

Figure 2:
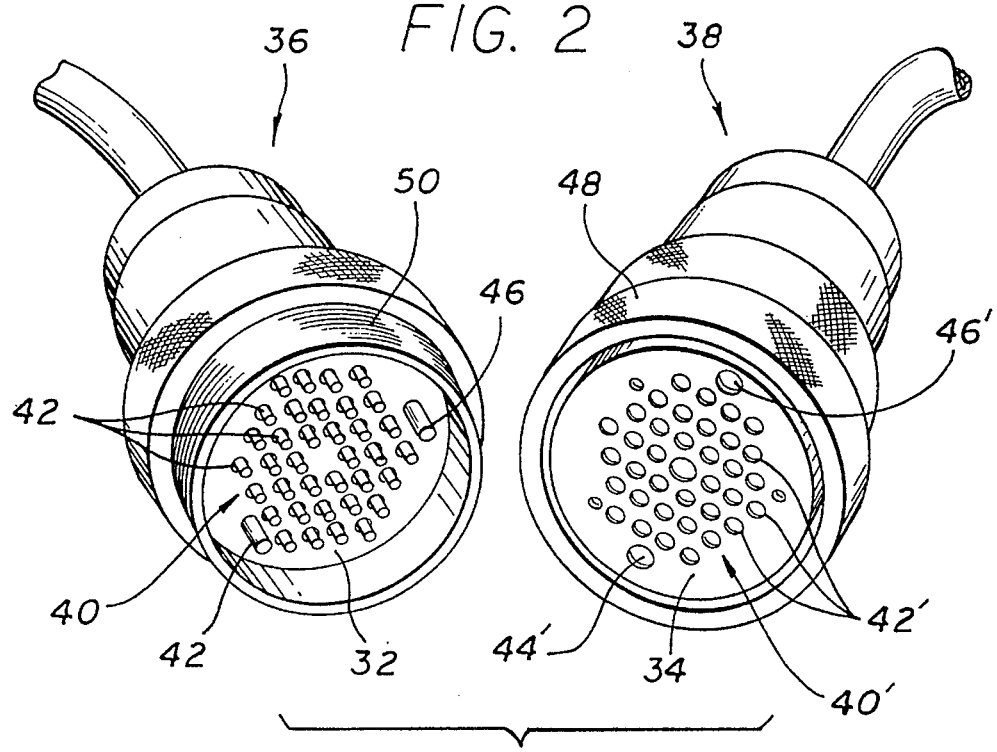
FIG. 2 is a perspective view illustrating the abutting faces of (disconnected) male and female elements of a multiple optical connector in accordance with the invention.

FIG. 2 is a perspective view of the exteriors of (disengaged) male and female members 36 and 38 of a representative multiple optical connector 12 presenting faces 32 and 34 respectively. Referring first to the male connector face 32, a plurality of ferrules 40 protrudes from a corresponding plurality of apertures 42. Each aperture 42 is located at the terminal end of an axial alignment channel (not shown in FIG. 2) of the male member 36. (It will be disclosed below that the connector face 32 comprises the front surface of a male body element, not shown in FIG. 2.) The female connector face 34 comprises the front surface of a holder element (not shown in FIG. 2) that sits in front of a female body element (also not shown).

Alignment pins 44, 46 extend from the male connector face 32 for mating with apertures 44', 46' in the female connector face 34. Referring further to the female member 38, a plurality of apertures 42' is arranged upon the female connector face 34, each being located at the end of an internal axial alignment channel (not shown in FIG. 2). Each of the apertures 42' (and its associated channel) is positioned within the female member 38 to align with a corresponding one of the plurality of apertures 42 (and associated channel) of the male member 36. As will be seen from FIG. 2, succeeding figures and the accompanying discussion, the correspondences between the internal axial alignment channels of the male and female members 36 and 38 assure the simultaneous independent axial alignment of multiple ferrules 40 retained within the male member 36 with corresponding ferrules retained and recessed within the channels of the female element 38.

A rotatable, interiorly-threaded ring 48 surrounds the connector face 34. An exteriorly-threaded ring 50 is provided at the outer edge of the connector face 32 for engaging ring 48. The rings 48 and 50, in conjunction, act to fasten the male and female members 36 and 38 to one another, assembling the multiple optical connector 12 for operation. It is of no particular consequence for the rotatable ring 48 to be associated with the female member 38 or for the exteriorly-threaded ring 50 to be associated with the male member 36. Rather, the threaded fastener rings 48 and 50 may be reversed with respect to the male and female members 36 and 38 without in any way affecting the invention. This reflects, in part, the general symmetry of the male and female members 36 and 38 in relation to one another. In fact, as will become apparent from FIGS. 4(a) and 4(b) below, the basic structures of the male and female members 36 and 38 are distinguished only by the presence of the holder element of the female member 38.

II. Characteristics of a Ferrule

The connector 12 serves to provide multiple independent connections between optical fibers mounted within ferrules. FIG. 3(a) is a side sectional view of a ferrule 52 of a type suitable for use in a multiple optical connector 12 in accordance with the invention. The ferrule 52 of FIG. 3(a) is of the tungsten carbide type discussed previously. It will be appreciated, however, that the invention may accommodate other types of ferrules, provided that each is generally in accordance with FIG. 3(a), including an elongated, rigid body for capturing the terminal end of an optical fiber.

The ferrule 52 comprises a generally-cylindrical elongated body with an outer shell 54 of tungsten carbide that encloses a filler material 56 (preferably a relatively-soft silver/nickel alloy). The filler material 56 encircles an optical fiber 58, substantially encapsulating it through the length of the ferrule 52 within a shaped fitting 60 of EPOXY or like adhesive. A brass element 62 stiffens the fiber 58 at its transition into the ferrule 52. An outer plastic coating 64 is stripped from the fiber 58 exposing it for encapsulation within the shaped adhesive fitting 60.

Very methods are required for precise centering of the optical fiber 58 within the ferrule 52. U.S. Pat. No. 4,763,980 of Gerber et al. entitled "Method and Apparatus For Centering the Core of a Light Guide Fiber in a Light Guide End Portion" describes a method for centering the fiber 58 within a ferrule 52. A crimping tool is commonly employed, creating small inward wedges (not shown in FIG. 3(a)) that exert pressure at the front of the filler material 56 to secure the optical fiber 58 with respect to the longitudinal axis of the ferrule 52.

FIG. 3(b) is an enlarged and detailed view, taken at line 3(b) of FIG. 3(a), of the terminal end of the optical fiber 58. The fiber 58 is shown in optical contact with an optical fiber 58' (shown in shadow outline), permitting the transmission of optical signals therebetween. The fibers 58 and 58' include polished termination ends or faces 68, 68' (continuations of, and substantially coextensive with, the faces 66, 66' of the respective ferrules) slanted at complementary angles θ and θ'. The faces of the individual fibers 58 and 58' are conventionally polished after affixation within the ferrules to which they have been mounted.

The termination of an optical fiber at a slant angle θ (θ') is a well known technique for minimizing optical signal retroflection (noise). Optical fibers are designed so that the index of refraction of a central core 70 (referring to the optical fiber 58) exceeds that of the surrounding cladding 74 and it is this differential in the indices of refraction that confines light traveling within the fiber 58 to the light-guiding core 70.

An optical fiber is characterized by an acceptance angle (usually about six degrees, also known as the numerical aperture) that is centered about the fiber axis. Light incident the end of the fiber within the cone of the acceptance angle will enter the fiber core and thus be transmitted. It is known that about four percent of the light transmitted by a optical fiber will be reflected from a highly polished fiber end. By angling or slanting the end of the fiber by about eight degrees to exceed the acceptance angle of the fiber one redirects such reflected, light from the fiber core where it would otherwise serve as a harmful secondary source.

As can be seen in FIGS. 3(a) and 3(b), the polished angled faces 68, 68' of the contacting fibers 58 and 58' are curved. Oppositely-acting axial compression forces, introduced by springs positioned at the ends of alignment channels of the male and female members, 36 and 38 will tend to flatten the curved faces 68 and 68' at the region of mutual contact. This enlarges the area of intimate contact between the aligned faces somewhat to enhance the quality of the optical interconnection. The springs and associated arrangements for generating the aforesaid compression force are disclosed in detail below and with particular reference to FIGS. 4(a), 4(b) and 5.

While the optical advantages of slanting the ends of optical fibers are recognized, the design of a multiple optical connector for capably retaining and interfacing of optical fibers is significantly complicated by their usage and presence. Proper mating between the fibers 58 and 58' is only obtained when the slanted faces 68 and 68' are precisely rotationally (i.e. angularly) aligned in the region of contact between the fiber cores 70 and 70' respectively. Without proper rotational alignment, a very large, wedge-like air gap (with the resultant loss of a large amount, if not all, of the transmitted optical signal) is created between the abutting fiber faces 68, 68' at the critical contact region.

III. Male and Female Members: Multiple Alignment Channels

Figure 4A:
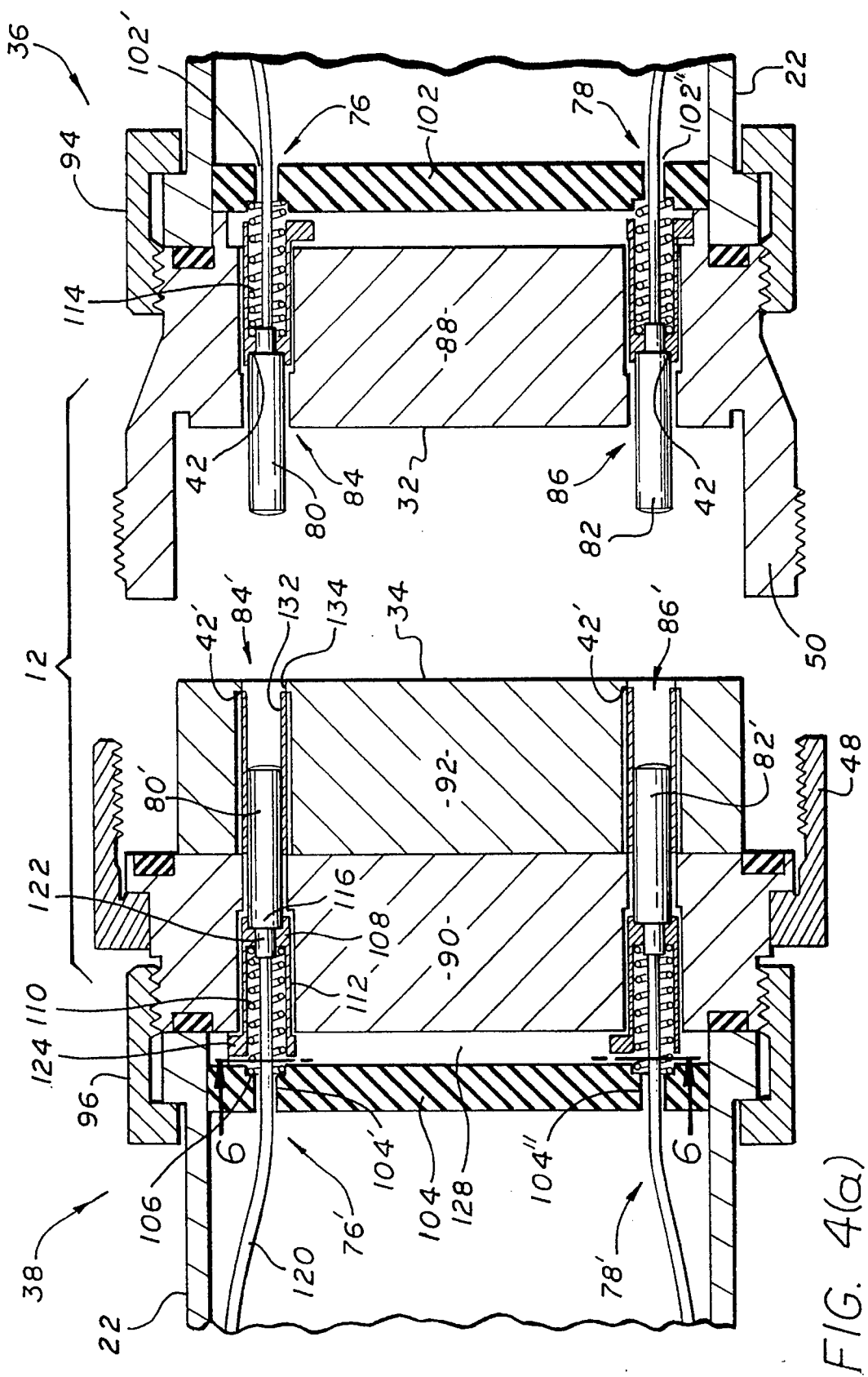
FIGS. 4(a) and 4(b) are side sectional views of a multiple optical connector comprising male and female members separately and coupled, respectively.
Figure 4B:
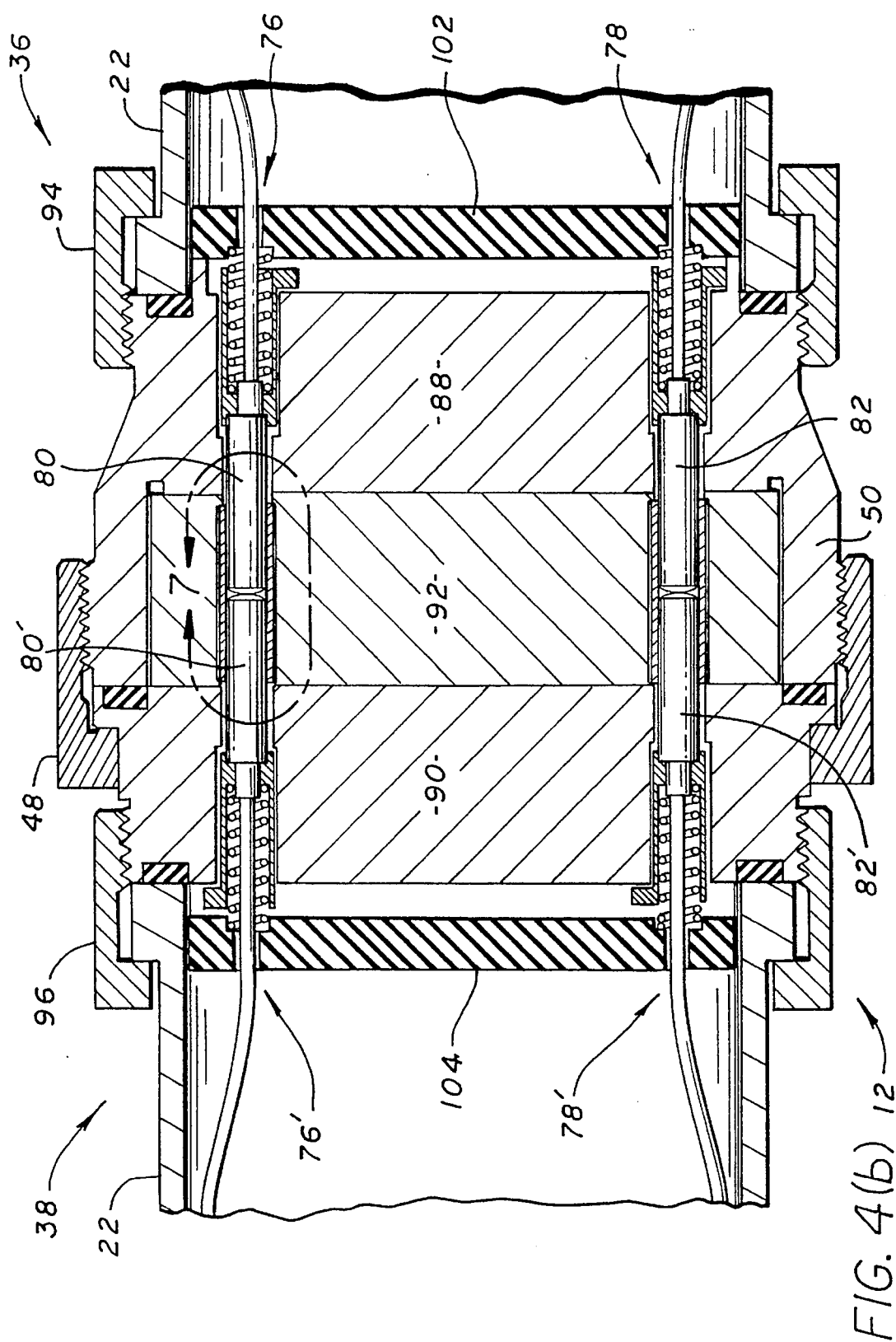

The connector 12 is arranged to provide simultaneous multiple independent optical interconnections of the type illustrated in FIG. 3(b). FIGS. 4(a) and 4(b) are side sectional views of a multiple optical connector 12 comprising mating male and female members 36 and 38 in accordance with the invention. In FIG. 4(a), the male and female members 36 and 38 are shown separate or disengaged while they are coupled in FIG. 4(b).

The multiple optical connector 12 corresponds generally in FIG. 4(a) to the view of FIG. 2. It should be kept in mind, however, that, while the details of only two fiber connections are illustrated in FIGS. 4(a) and 4(b), it is a significant feature of the present invention that a very large plurality of independent, high quality optical connections are simultaneously achieved. The principles and design details of the invention discussed with particular reference to FIG. 4(a) below extend to a large plurality of optical connections in a connector 12 in accordance with the invention. While the discussion will proceed with primary reference to a single optical connection, it is to be appreciated that such connection is representative of a plurality of like, independent optical interconnections simultaneously achieved by straightforward extension within the teachings of this invention.

Returning to FIG. 4(a), the connector 12 simultaneously secures high quality (low loss, low noise) optical interconnections between pairs of optical fibers 76, 76' and 78, 78' through the aligned coupling of the male and female members 36 and 38 as shown in FIG. 4(b). Referring first to the male member 36 (right hand side of FIG. 4(a)), the fibers 76 and 78 are mounted to ferrules 80 and 82 respectively. As can be seen, each of the ferrules 80 and 82 is aligned within an alignment channel 84, 86 and thereby retained within a male body element 88. Similarly, the fibers 76', 78' are mounted to ferrules 80' and 82' that are aligned within alignment channels 84', 86' to be retained within the female member 38.

The alignment channels 84' and 86' extend through both a female body element 90 and an adjacent holder 92. As mentioned earlier, the male and female members 36 and 38 are essentially identical with the exception of the presence of the holder 92 within the female member 38. As illustrated in FIG. 2, the alignment channels 84', 86' for receiving ferrules within the female member 38 terminate in a plurality of apertures 42' at the female connector face 34 that corresponds to the front surface of the holder 92. The alignment channels 84, 86 for receiving ferrules within the male member 36 terminate in a plurality of apertures 42 at the male connector face 32.

The rotatable, interiorly-threaded ring 48 and the exteriorly threaded ring 50 fasten the male and female members 36 and 38 to one another in operation. Ring-like clamps 94 and 96 secure the male and female body elements 88 and 90 respectively to the hose-like coverings 22 previously discussed with reference to FIGS. 1(a) and 1(b), supra.

Back plates 102 and 104 of the male and female members 36 and 38 include channels 102', 102" and 104', 104" aligned with the alignment channels 84, 86 and 84', 86' respectively. Each of the shallow back plate channels 102', 102", 104' and 104" includes a shoulder, such as shoulder 106 of the channel backplate 104'. Such shoulder 106 is provided for capturing the rear end of a spring 110. The opposed end of the spring 106 abuts the rear of an interior annular ridge 108 of a cup 112 to which the ferrule 80' is fixed. The cup 112, which includes an associated mechanism for locking the ferrule 80' into the alignment channel 84' with a predetermined angular (or rotational) orientation, will be described and illustrated in greater detail below.

The spring 110, in combination with a similarly-situated spring 114 of the alignment channel 84 of the male member 36, provides a compressive force for urging the faces of the contacting ferrules 80 and 80' together (see FIG. 4(b)). The beneficial effect of such a compressive force has been discussed above. It is to be noted that, in a connector 12 in accordance with the invention, a plurality of such compressive forces, each associated with one of a plurality of fiber-to-fiber connections, is simultaneously provided upon engagement of the male and female members 36 and 38 as shown in FIG. 4(b).

In addition to providing a compressive force for flattening the fiber ends of the contacting ferrules 80 and 80', the spring 110, in combination with the (pair of) springs associated with the other corresponding alignment channels acts to take up ferrule tolerance and length variations from optically contacting ferrule pair-to-ferrule pair. As a result, compression forces, within tolerable limits, are experienced at each pair of contacting fiber faces. This is to be contrasted with so-called "hard" connections and is particularly important in view of the small areas and critical sensitivities associated with fiber-to-fiber couplings.

Each spring, such as the spring 110, is slightly compressed upon coupling or fastening of the male and female members 36 and another as shown in FIG. 4(b). To the extent that the combined lengths of the ferrules of one axially-aligned ferrule pair loaded into an alignment channel might exceed that of another, the independent pliabilities of the individual connections permit the simultaneous, independent imposition of compression forces of differing, but not excessive, magnitudes to take up the aforesaid length and tolerance variations. Thus, the quality of each optical connection is independently assured. In fact, the independent pliabilities associated with the multiple alignment channels of a connector in accordance with the invention permit the use of pairs of ferrules of differing designs, differing complementary slant angles, makes, sizes and types within a single multiple optical connector 12. In addition, the independent nature of the optical couplings allows one to mix ferrule pairs of the type that terminate with complementary slant angles with those whose faces are not inclined at an angle.

IV. Rotational Alignment of Ferrules

Figures 5, 7:
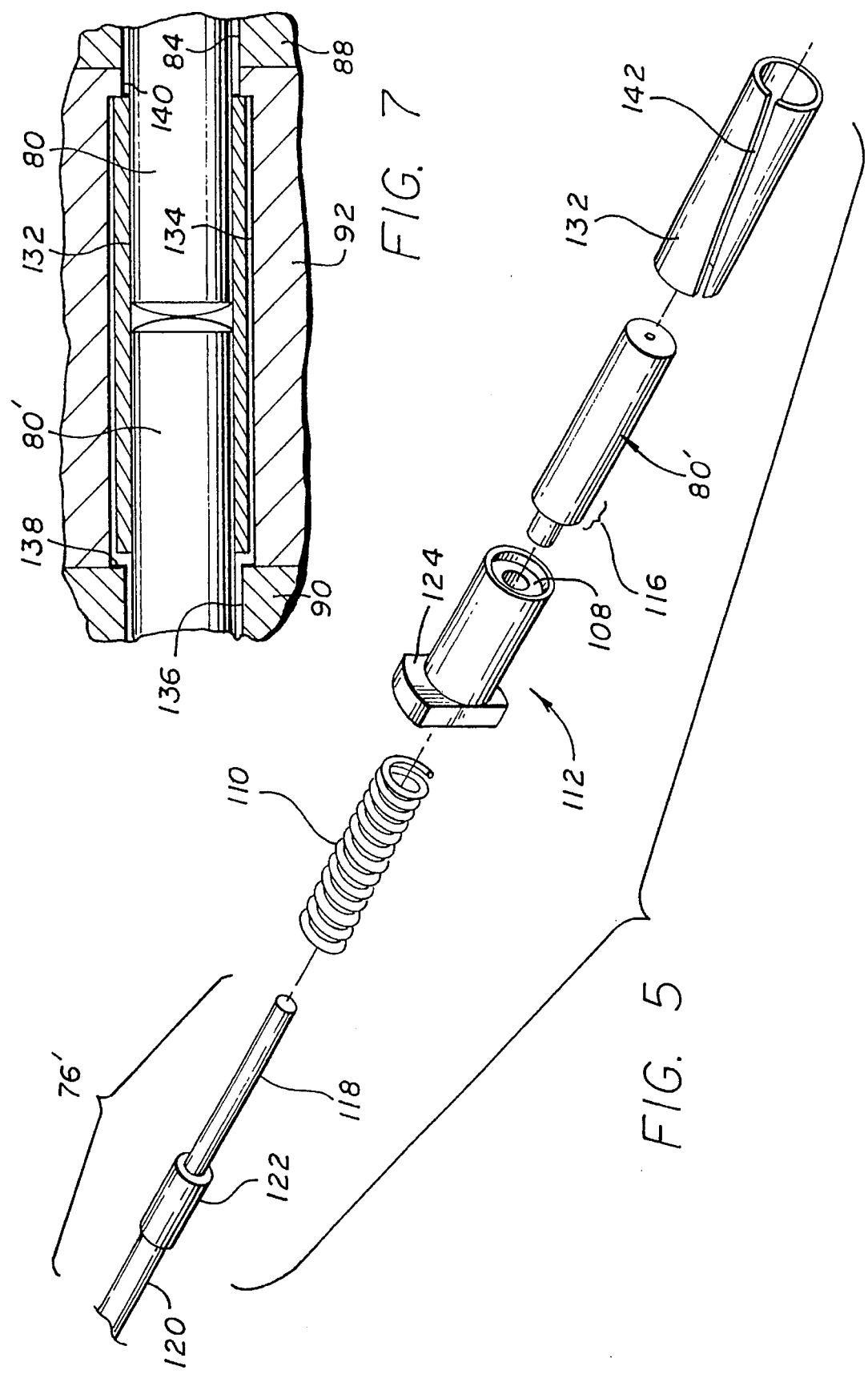
FIG. 5 is an exploded perspective view of assemblies associated with a representative ferrule and optical fiber that render or configure the ferrule subject to precise and reliable alignment, both axially and rotationally, within a representative alignment channel of a male or female connector member.
FIG. 7 is a detailed view of the region of contacting ferrules taken at line 7 of FIG. 4(b).

In addition to providing independent compressive loading of each fiber-to-fiber interface, the connector 12 assures that each ferrule (and fiber mounted thereto) is correctly rotationally aligned when retained by either the male member 36 or the female member 38. FIG. 5 is an exploded perspective view of assemblies, some already discussed, associated with the representative ferrule 80' (and the optical fiber 76' that is terminated therewith) that render or configure the ferrule 80' subject to precise and reliable alignment, both axially and rotationally, within the representative alignment channel 84'. As shown, the fiber 76' includes a terminal portion 118 that has been stripped to the cladding and a main portion 120 that includes a protective plastic jacket. As described with reference to FIG. 3(a) supra, a brass element 122 is provided at the transition from the jacket portion 120 to the stripped portion 118. A fuller understanding of the angular alignment mechanism will proceed from simultaneous reference to FIGS. 4(a), 4(b), 5 and 6 where FIG. 6 is a plan view of the rear surface of the female body element 90 taken at line 6—6 of FIG. 4(a) and illustrating mechanisms for locking the rotational orientation of a ferrule within an alignment channel of a male or a female member. (It should be noted that the rear surface of the male body element 88 is of like design.)

Referring now to the referenced figures and giving particular attention to the representative ferrule 80' and associated arrangements, the rear portion 116 of the ferrule 80' is affixed, by means of appropriate adhesive, to the matching interior annular ridge 108 at the forward portion the tube-like positioning cup 112. The cup 112 includes, at its rear end, an asymmetrical keying member 124. The keying member 124 interacts with the configuration of the rear surface of the female body element 90 to lock the (pre-set) rotational or angular orientation of the ferrule 80' (and the fiber 76' mounted thereto) upon retention within the alignment channel 84'. As discussed and illustrated supra, the maintenance of precise rotational alignment between mutually contacting ferrule pairs is particularly essential when interfacing ferrule pairs that terminate with faces polished at complementary slant angles.

As is most clear from FIGS. 5 and 6, the keying member 124 is irregularly shaped, comprising, in planar perspective, three mutually orthogonal straight sides connected by a rounded edge. Turning to FIG. 6, the rear face of the female body element 90 (identical to that of the male body element 88) comprises a plurality of vertical slots 126 defined and bordered by pairs of cantilevered vertical shelves 128. The longitudinal axes of the plurality of alignment channels of the female members 38 are identified by the numeral 130 and are approximately centered within the slots 126.

As can be seen, the presence of the vertical shelves 128 at the rear of the alignment channels of the female (or male) body element permit the ferrule-fixed cups to be inserted into, and thereafter locked within alignment channels with one of two orientations. They may be inserted and held within the connector 12 so that the rounded edge of a given keying member of a cup is either "up" or "down". This allows one to secure the proper mating of complementarily slanted ferrule pairs when retained within the connector 12.

The ferrule 80' is adhesively bonded to the cup 112 prior to insertion into the female member 36. Thereafter, and prior to insertion, the face of the ferrule 80' (with the cup 112 fixed thereto) may be polished at a predetermined slant angle relative to its longitudinal axis. Correct orientation of the plane of the slant angle is assured by polishing the ferrule face in relation to the asymmetrical shape of the keying member 124, keeping in mind that the ferrule 80' (and associated cup 112) will be held within the female body element 90 so that the rounded edge of the keying member 124 is vertically aligned. A like process can be applied to each ferrule, producing a plurality of ferrules whose faces have been polished with reference to their orientations when retained within the connector 12.

Since the face of the ferrule 80' is polished only after it has been fixed to the cup 112 and since the orientation of the asymmetrical keying member 124 is also fixed with respect to the ferrule-retaining cup one can readily prepare ferrule faces of predetermined orientation with respect to the connector 12. It is, of course, essential that complementary orientations be provided at the faces of contacting ferrule pairs. As long as such complementarity is maintained from pair to pair, the desired complementary orientations are then readily and properly locked upon insertion of the ferrules into the alignment channels of the male and female members. (The back plate 104 is removed from the female connector 38 to allow insertion of ferrules into the alignment channels. Thereafter, the springs are loaded as shown and secured within the channels by bolting the back plate 104 to the female body element 90. A corresponding process takes place at the male member 36.)

Comparison of the male and female members 36 and 38 of FIGS. 4(*a*) and 4(*b*) will show that the cups of interfacing ferrules have been loaded into the alignment channels of the male and female members 36, 38 in complementary fashion. That is, the rounded edge of each keying member (which appears as the relatively larger vertical dimension in FIGS. 4(*a*) and 4(*b*)) points up within each alignment channel of the female member 38 and down within each alignment channel of the male member 36. While not essential, the illustrated loading scheme can be helpful in simplifying the simultaneous orientation and locking of many pairs of optically contacting ferrules. Assuming that each ferrule has been polished with the same slant angle and orientation with respect to the keying member of its cup, the resulting reversal of cup orientations from female member to male member creates a complementary angular orientation at each ferrule-to-ferrule interface. (The particular relative arrangements of the cups within the male and female members 36 and 38 may be reversed without affecting the matching of complementarily-slanted interfacing ferrule pairs within the connector 12.) Thus, upon fastening of the male and female members 36 and 38 to one another, independent, matching rotational alignments of multiple pairs of cup-mounted ferrules are simultaneously achieved in each of which an optical contact generally in accordance with FIG. 3(*b*) is obtained. The repetition of the disclosed orientation of the cup keying members within the slots at the rear of the male and female body elements will produce an arrangement of identically slanted faces of ferrules retained within the male members and complementary, identically slanted faces of ferrules retained within the female member.

V. Ceramic Guide Sleeves

As mentioned earlier, proper axial alignment is attained by carefully locating matching (i.e. coaxial) axial alignment channels for receiving ferrules within the male and female members 36 and 38. In addition, an axial guide sleeve 132 (shown in detail in FIG. 5) of appropriate ceramic material such as zirconium is captured and floats within the portion 134 of the alignment channel 84' that extends through the holder 92. Since only the female member 38 includes a holder 92, a ceramic sleeve is not associated with the male member 36.

FIG. 7 is a detailed view, taken at line 7 of FIG. 4(*b*), of the region of contact between the ends of the ferrules 80' and 80 retained in matching alignment channels 84' and 84 of the female and male members 38 and 36 respectively. As shown, the inner diameter of the portion 134 of the axial channel 84' that extends through the holder element 92 exceeds the inner diameter of the portion 136 of the channel 84' that extends through the female body element 90 at the junction of the body element 90 with the holder 92. The disparity in diameters produces an annular shoulder 138 at the holder 92—body 90 interface. An annular lip 140 exists at the front end of the channel portion 134. In combination, the shoulder 138 and the lip 140 act to capture the ceramic sleeve 132 within the channel portion 134.

The sleeve 132, whose unstressed inner diameter is somewhat less than the outer diameter of a ferrule, floats and is retained within the channel portion 134 when the alignment channel 84' of the female member 38 is empty. A lengthwise slit 142 (illustrated in FIG. 5) permits radial expansion of the sleeve 132 to accommodate the greater diameter of a ferrule and to provide a tight fit therewith. This effect will occur both when a ferrule is inserted into the sleeve 132 through the female alignment channel 84' (the ferrule 80') and through the male alignment channel 84 (the ferrule 80).

When a ferrule is inserted into the sleeve 132, the effective inner diameter of the portion 134 of the channel 84' is reduced and the degree of "play" available the terminal end of a ferrule correspondingly lessened. Further, since the guide sleeve 132 floats within the channel portion 134 prior to insertion of a ferrule and is fabricated of ceramic material with a longitudinal slit 142, it offers a relatively gentle and benign interface capable of correcting for the possible axial misalignment of an incoming ferrule with the channel portion 134. Such misalignment may be due, for example, to slight misalignment of the faces 32 and 34 with respect to one another. By effectively cushioning the alignment correction process the guide sleeve 132 protects the ferrules during precision alignment.

Thus it is seen that the present invention provides a multiple optical connector that is particularly useful for hydrophone applications. By employing the teachings of the present invention, one may attain a plurality of low-loss optical connections in a single connector. While the invention is not limited to hydrophones, this is often required, and of particular utility in transmitting between a ship and an array of acousto-optic hydrophones. The connector of the invention assures both axial and rotational alignment of mating fiber segments and, by providing independent spring loading of each connection, assures that ferrule pairs of different tolerances and types will perform well within the same connector.

While this invention has been described with reference to its presently preferred embodiment, it is not limited thereto. Rather, this invention is only limited insofar as defined by the following set of patent claims and includes within its scope all equivalents thereof.

What is claimed is:

1. A connector for simultaneously contacting a first plurality of optical fibers, each of which includes a ferrule-mounted terminal end, with a second plurality optical fibers, each of which includes a ferrule-mounted terminal end, comprising, in combination:

a) a male member comprising a first body element having a plurality of internal channels extending therethrough for retaining said first plurality of ferrule-mounted terminal ends;

b) a female member comprising a second body element having a plurality of internal channels extending therethrough for retaining said second plurality of ferrule-mounted terminal ends so that, when said male and female members are engaged to one another, each of said channels of one body member is substantially coaxial with a channel of the other body member when said channels are engaged whereby the terminal ends of corresponding optical fibers are axially aligned;

c) each of said members including at least one spring-loaded assembly including a spring coaxial with an internal channel of a body element for exerting a compressive force between the ends of aligned ferrule-mounted optical fibers;

d) a fastener for engaging said members to one another; and e) an asymmetrical keying member associated with each of said fibers for rotationally aligning the terminal end thereof.

2. A connector as defined in claim 1 further characterized in that each of said spring-loaded assemblies further includes:

a) a substantially cylindrical cup, said cup being affixed to the rear portion of a ferrule; and b) said spring abuts said rear portion of said ferrule.

3. A connector as defined in claim 2 wherein each of said male and female members includes a back plate adjacent the rear surface of said first and second body elements for capturing the opposed end of said springs.

4. A connector as defined in claim 3 wherein said asymmetrical keying member is further characterized in that:

a) said keying member is fixed to the rear of said cup; and b) a plurality of slots is provided at the rear surface of said first and second body elements for locking said keying members with predetermined angular orientations within said male and female members.

5. A multichannel fiber optic connector comprising, in combination:

a) a male member comprising a first body element;

b) a female member comprising a second body element;

c) each of said male and female members including a plurality of substantially mutually-aligned channels therethrough comprising a plurality of internal channels extending through each of each of said first and second body elements;

d) a spring loaded assembly including a spring substantially coaxial with an internal channel associated with and positioned within each of said channels;

e) a back plate adjacent the rear surface of said first body element and of said second body element for capturing said spring;

f) said female member including (i) a holder located adjacent the front surface of said second body element, (ii) said holder including a plurality of internal channels extending its width, (iii) each of said channels being aligned and continuous with a channel of said second body element and (iv) a ceramic sleeve located within each internal channel of said holder; and g) a fastener for engaging said members to one another whereby corresponding channels of said members are simultaneously aligned.

6. A connector as defined in claim 5 further characterized in that:

a) the inner diameter of each internal channel of said body element adjacent said holder is less than the inner diameter of the aligned internal channel of said holder whereby an annular shoulder is formed at the interface of each internal channel of said second body element with the aligned internal channel of said holder; and b) an internal annular lip is located at the opposite end of each internal channel of said holder whereby each ceramic sleeve is captured within an internal channel of said holder.

7. A connector as defined in claim 6 wherein said ceramic sleeve has a lengthwise slit.

8. A connector for simultaneously contacting a first plurality of optical fibers, each of which includes a ferrule-mounted terminal end, with a second plurality of optical fibers, each of which includes a ferrule-mounted terminal end, comprising, in combination:

a) a male member comprising a first body element having plurality of internal channels extending therethrough for retaining said first plurality of ferrule-mounted optical fiber terminal ends;

b) a female member comprising a second body element having a plurality of internal channels extending therethrough for retaining said second plurality of ferrule-mounted optical fiber terminal ends;

c) said male and female members being arranged so that each of said channels of one body member is substantially coaxial with a channel of the other body member when said members are engaged;

d) an asymmetrical keying assembly associated with each of said fibers for rotationally aligning the terminal ends of contacting optical fibers; and e) a threaded fastener for engaging said members to one another.

9. A connector as defined in claim 8 wherein each spring loaded assembly includes a spring that is substantially coaxial with an internal channel.

10. A connector as defined in claim 9 wherein an asymmetrical keying member is associated with each of said fibers for rotationally aligning the terminal end thereof.

11. A connector as defined in claim 10 further characterized in that each of said spring-loaded assemblies further includes:

a) a substantially cylindrical cup, said cup being affixed to the rear portion of a ferrule; and b) said spring abuts said rear portion of said ferrules.

12. A connector as defined in claim 11 wherein each of said male and female members includes a back plate adjacent the rear surface of said first and second body elements for capturing the opposed end of said springs.

13. A connector as defined in claim 12 wherein said asymmetrical keying member is further characterized in that:

a) said keying member is fixed to the rear of said cup; and b) a plurality of slots is provided at the rear surface of said first and second body elements for locking said keying members with predetermined angular orientations within said male and female members.

14. A connector as defined in claim 8 wherein said female member additionally comprises:

a) a holder, said holder being located adjacent the front surface of said second body element;

b) said holder including a plurality of internal channels extending the depth of said holder; and c) each of said channels is aligned and continuous with a channel of said second body element.

15. A connector as defined in claim 14 further characterized in that said ferrules retained by said male member extend from the front of said first body element and said ferrules retained by said female member extend from the front of said second body element into the channels within said holder.

16. A connector as defined in claim 15 further including a ceramic sleeve located within each internal channel of said holder.

17. A connector as defined in claim 16 further characterized in that:

a) the inner diameter of each internal channel of said second body element adjacent said holder is less than the inner diameter of the aligned internal channel of said holder whereby an annular shoulder is formed at the interface of each internal channel of said second body element with the aligned internal channel of said holder; and b) an internal annular lip is located at the opposite end of each internal channel of said holder whereby each ceramic sleeve is captured within a holder channel.

18. A connector as defined in claim 17 wherein said ceramic sleeve has a lengthwise slit.

19. A connector for simultaneously contacting a first plurality of optical fibers, each of which includes a ferrule-mounted terminal end, with a second plurality of optical fibers, each of which includes a ferrule-mounted terminal end, comprising, in combination:

a) a male member comprising a first body element having a plurality of internal channels extending therethrough for retaining said first plurality of ferrule-mounted terminal ends;

b) a female member comprising a second body element having a plurality of internal channels extending therethrough for retaining said second plurality of ferrule-mounted terminal ends so that, when said male and female members are engaged to one another, the terminal ends of corresponding optical fibers are axially aligned;

c) said female member including (i) a holder located adjacent the front surface of said second body element, (ii) said holder including a plurality of internal channels and (iii) each of said channels being aligned and continuous with a channel of said second body element;

d) said ferrules retained by said male member extending from the front of said first body element and said ferrules retained by said female element extending from the front of said second body element into the channels within said holder;

e) a ceramic sleeve being located within each internal channel of said holder;

f) each of said members including at least one spring-loaded assembly for exerting a compressive force between the ends of aligned ferrule-mounted optical fibers; and g) a fastener for engaging said members to one another.

20. A connector as defined in claim 19 further characterized in that:

a) the inner diameter of each internal channel of said second body element adjacent said holder is less than the inner diameter of the aligned internal channel of said holder whereby an annular shoulder is formed at the interface of each internal channel of said second body element with the aligned internal channel of said holder; and b) an internal annular lip is located at the opposite end of each internal channel of said holder whereby each ceramic sleeve is captured within a holder channel.

21. A connector as defined in claim 20 wherein said ceramic sleeve has a lengthwise slit.

* * * * *